May 29, 1956   E. C. RAEHRS ET AL   2,747,271
PROCESS OF MACHINING

Filed Feb. 10, 1951   6 Sheets-Sheet 1

INVENTORS
EMERY C. RAEHRS
WILLIAM D. AVERILL
BY H. K. Parsons & L. W. Wright
ATTORNEYS.

May 29, 1956  E. C. RAEHRS ET AL  2,747,271
PROCESS OF MACHINING
Filed Feb. 10, 1951  6 Sheets-Sheet 3

INVENTORS
EMERY C. RAEHRS
BY  WILLIAM D. AVERILL
H. K. Parsons + L. W. Wright.
ATTORNEYS.

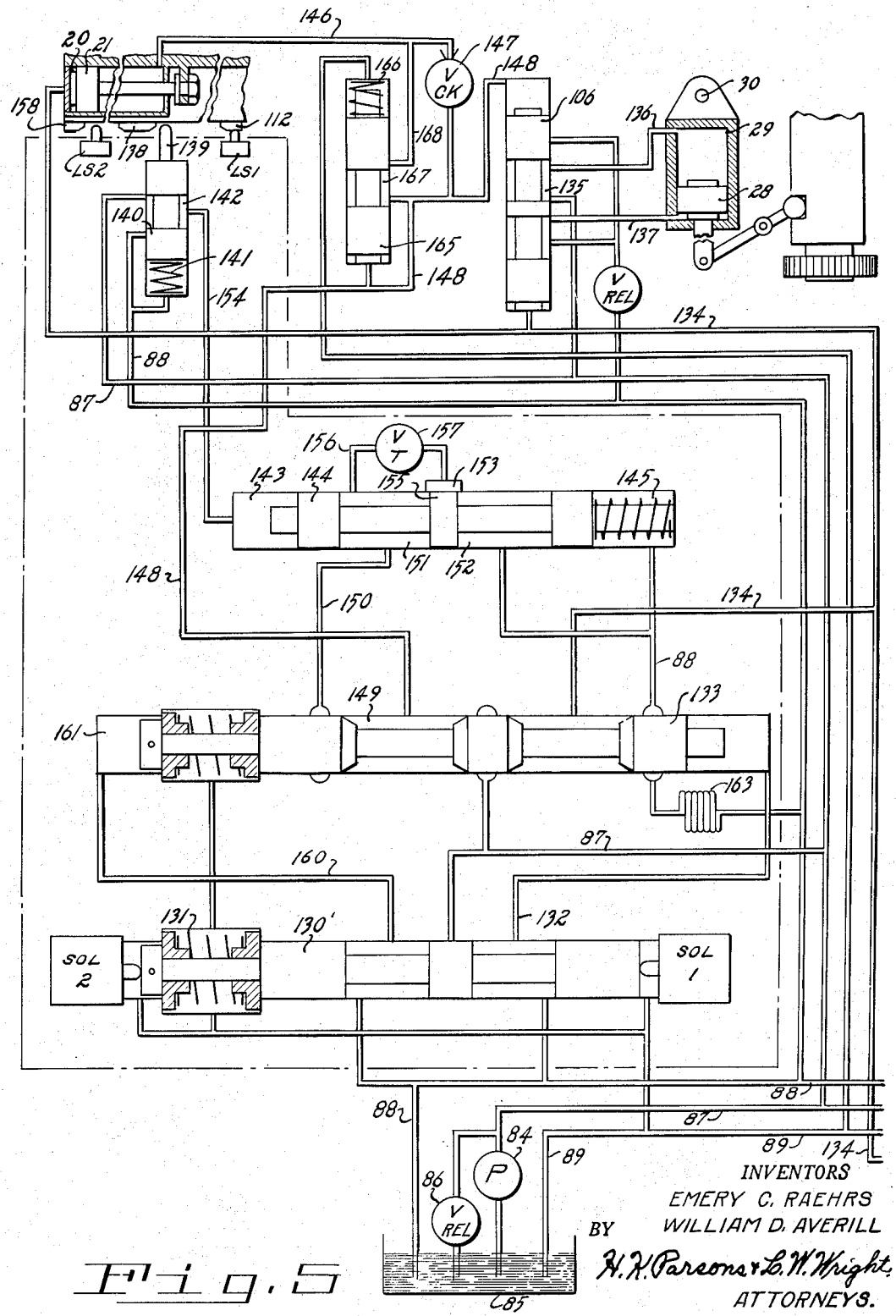

May 29, 1956  E. C. RAEHRS ET AL  2,747,271
PROCESS OF MACHINING
Filed Feb. 10, 1951  6 Sheets-Sheet 5

INVENTORS
EMERY C. RAEHRS
WILLIAM D. AVERILL
BY H. K. Parsons & L. W. Wright
ATTORNEYS.

United States Patent Office 2,747,271
Patented May 29, 1956

2,747,271

PROCESS OF MACHINING

Emery C. Raehrs, Cincinnati, and William D. Averill, Mariemont, Ohio, assignors to The Cincinnati Milling Machine Co., Cincinnati, Ohio, a corporation of Ohio Application February 10, 1951, Serial No. 210,314

5 Claims. (Cl. 29—558)

This invention relates to an improved process of machining or performance of metal removing operations.

One of the principal objects of the present invention is the provision of a novel and improved process particularly adapted for substantially continuous high production formation of accurately finished surfaces on metal or like work pieces.

A further object of the invention is the provision of an improved process of machining or performing sequential metal removing operations on a work piece in a highly efficient manner to effect initial rough cutting or appreciable stock removal and a subsequent cross cut finishing operation by a cutting operation crossing over the feed marks resultant from the initial rough cutting operation to produce a smoothly finished surface of maximum desirability.

A further object of the invention is the provision of an improved process of machining which will greatly reduce the overall time of performance of consecutive machining operations on a work piece and eliminate the normal station to station movement, eliminate tool movements hitherto deemed necessary in performance of successive machining operations, and insure most effective relative cutting speed movements of work and successive operating tools during the performance of the machining operation.

In the drawings there has been illustrated one form of machine suitable for carrying out of the present novel process, but it is to be understood that the process in its broad aspect may be carried out by varying types of machines other than the specific embodiment here shown for purposes of illustration, including machines using strictly linear, rather than rotary, relative movement of the work and final surfacing tool without departing from or exceeding the scope of the invention.

Figure 5:
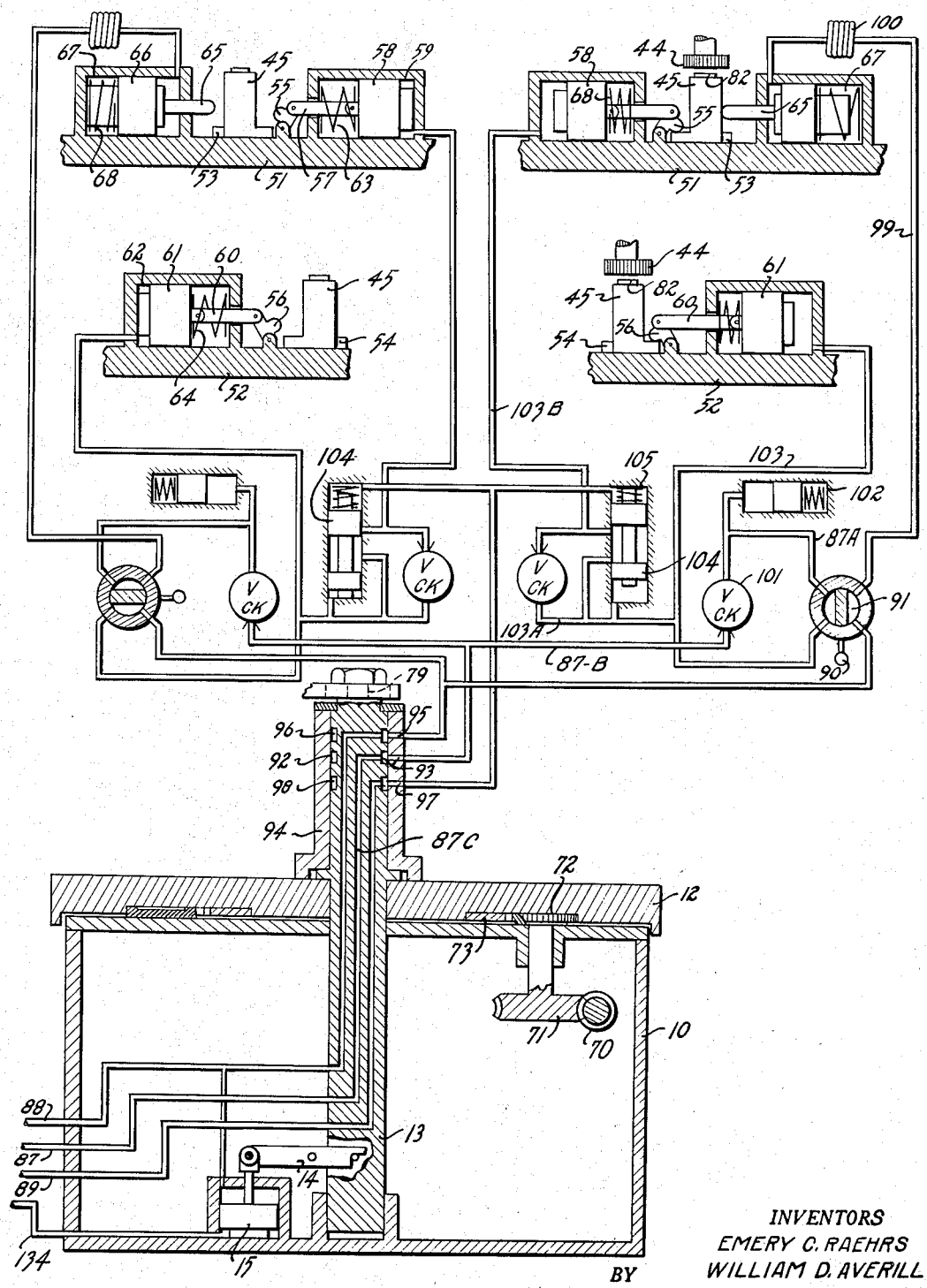
Figure 7:
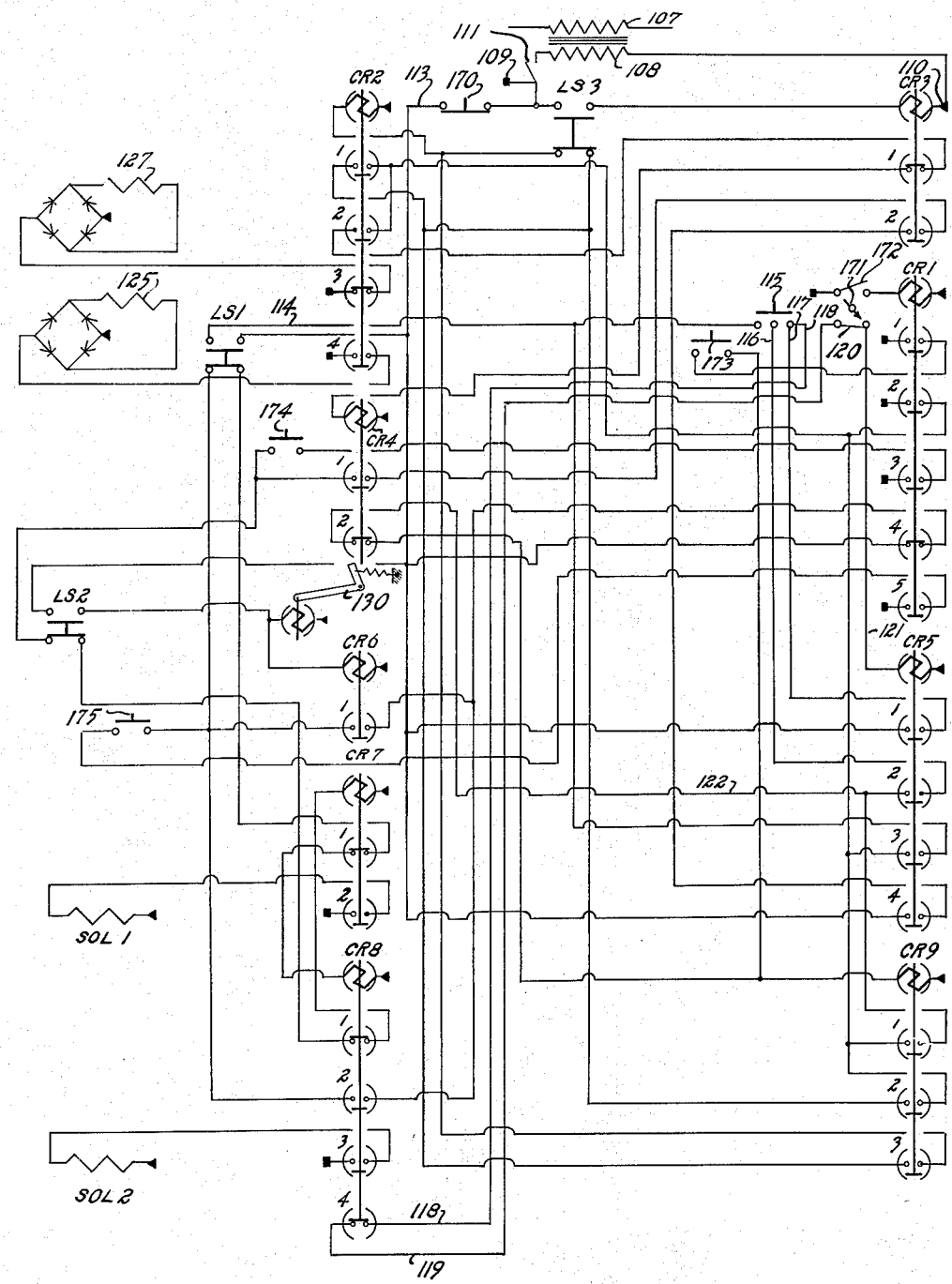

Figures 5 and 6 jointly constitute a diagrammatic view of the hydraulic circuits, controls, and mechanism operated thereby, and Figure 7 is a diagrammatic view of the electrical control circuit of the machine.

In the drawings in which similar characters of reference are employed to denote corresponding parts throughout the several views, the numeral 10 designates the bed of the machine provided with a circular way portion 11 supporting a table 12 for rotation about the trunnion post 13. This post is supported by the bed 10 for limited vertical movement under control of clamping lever 14 actuable by the hydraulic piston 15.

Rearwardly, the bed is provided with horizontal ways 16 for the ram or slide 17 which extends upwardly from the bed and is provided with ways 18 for the vertically movable spindle carrier 19. A cylinder 20 mounted on the bed contains the hydraulically actuable piston 21 having a rod 22 connected to the depending lug 23 of the ram 17 for effecting advancing forward and retracting movements of the ram. A lever 24 is intermediately pivoted to the slide 17 and has an actuating portion 25 interengaged with the socket 26 in the head 19. The opposite end of this lever is pivoted to rod 27 of piston 28 movable in cylinder 29 which is pivoted at 30 to the slide 17. By means of this mounting the cylinder may have a slight oscillating movement to compensate for the arcuate swinging of the outer end of lever 24 while effecting the necessary pivotal movement of the lever to raise and lower the spindle carrier 19. Mounted on the slide 17 is a drive motor 31 provided with the sheaves 32 for the drive belts 33 extending over the second set of sheaves 34 mounted on the spindle carrier 19. Power is thus transmitted to pinion 35 on the shaft 36 actuated by the sheaves 34 and from this pinion through gear 37 to the intermeshing gears 38, 39 and 40 operating the respective cutter spindles 41, 42, and 43 on which are mounted the milling cutters 44.

Figure 1:
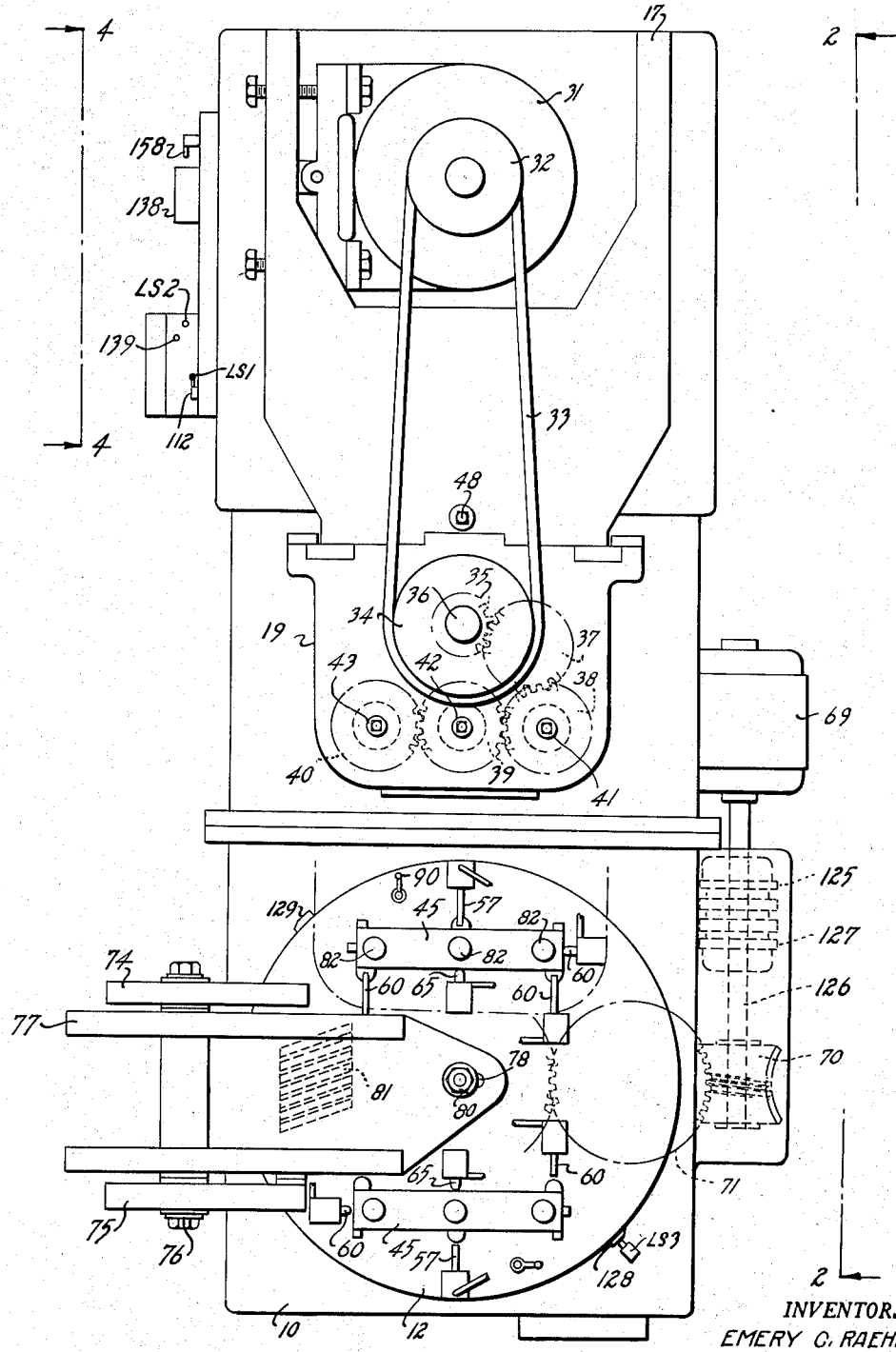
Figure 1 is a plan view of one form of machine suitable for use in carrying out the present process.
Figure 2:
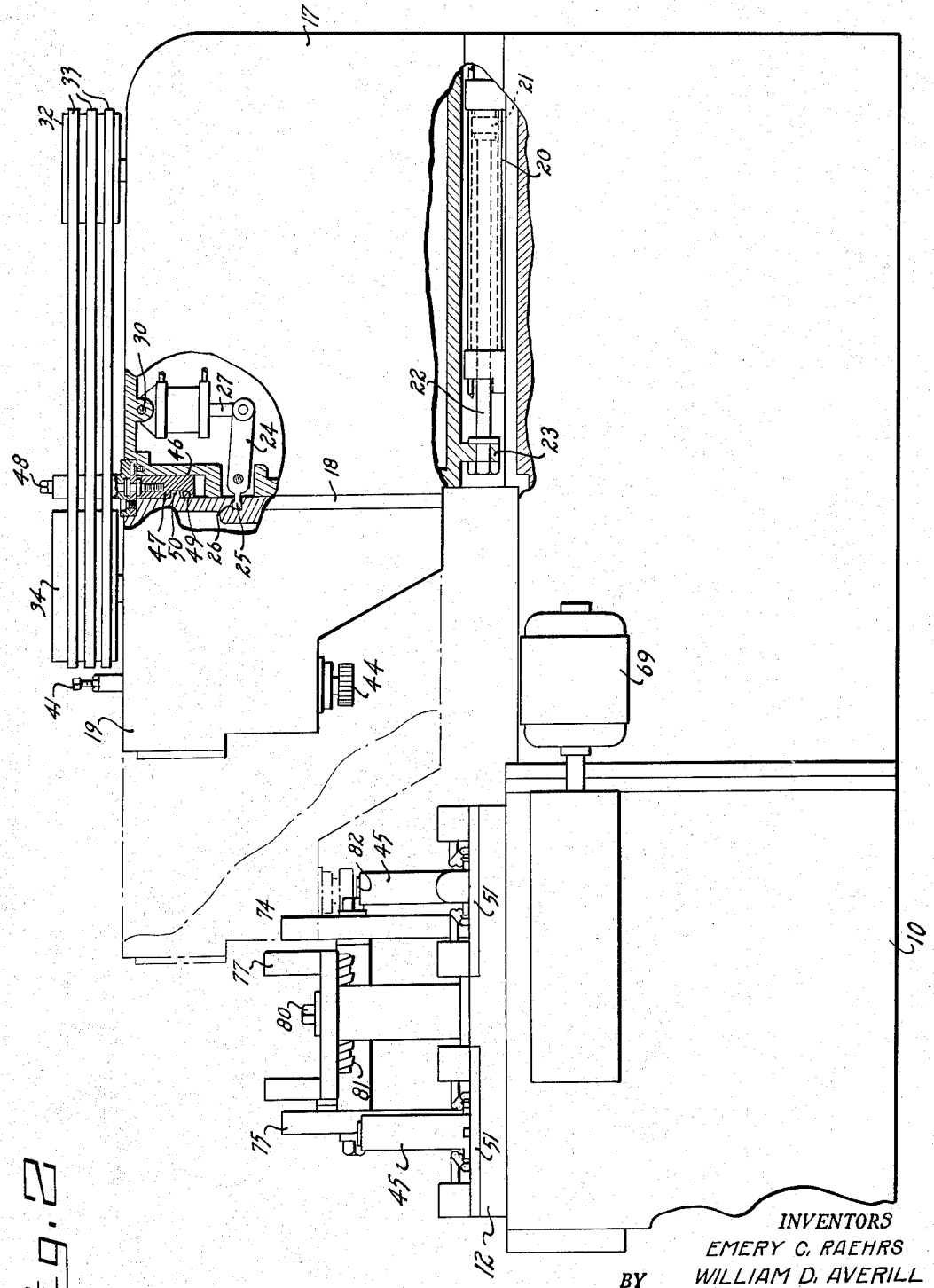
Figure 2 is a side elevation of such a machine.

It will be evident that with the structure described, the slide 17 can be moved forwardly to bring the cutters into operative relation with a work piece 45 as indicated by the dotted lines in Figure 2 and likewise that the vertical movement of the cutters 44 in a direction toward or from the work may be controlled by suitable actuation of lever 24.

In the particular utilization of the invention illustrated, it is contemplated that the cutters 44 are shifted to their lower position before being moved into engagement with the work piece 45, but that at the completion of the milling operation they will be elevated above the finished surface for rapid retraction without dragging the cutters over the milled surface. For control of this particular operation the ram 17 is provided with a socket at 46 receiving the stop plate 47 whose position may be vertically adjusted by screw 48 swiveled to the ram 17. This stop plate is provided with a recess 49 to receive the lug or rib 50 on the spindle carrier 19, the width of the groove or recess 49 being greater than that of the rib 50 so that there may be a limited movement of desired amount between the parts. Interengagement of the lower edge of the rib with the lower face of the groove definitely and positively determines the limit of downward movement of the cutters 44 when the piston 28 is raised, which limit may be varied by vertical adjustment of the stop plate 47. Likewise, interengagement of the upper face of the rib with the upper face of the groove limits the amount of the retraction of the carrier. The relative dimensions of these parts determine the extent of advance and retraction of the cutter spindles, while adjustment of the plate 47 determines the zone in which these movements take place.

Carried by the rotatable table 12 are a pair of work supporting fixtures designated as an entirety by the reference characters 51 and 52 embodying suitable means for supporting and clamping individual work pieces.

These means, as respects each figure, include fixed members 53 and 54 for positioning engagement with the work piece 45 and the hydraulically actuable clamps 55 and 56. Clamp 55 is coupled by rod 57 with piston 58 movable in cylinder 59, while clamp 56 is coupled by rod 60 with piston 61 movable in cylinder 62. Springs 63 and 64 are provided to retain the pistons in normally retracted or unclamping position, while introduction of hydraulic pressure as hereinafter described into the opposite ends of the cylinders will move the pistons inwardly from the positions indicated at the left of Figure 6 to the position indicated as respects the other of the fixtures in the right hand portion of Figure 6. These clamps, it will be noted, operate on certain available holding flanges on the work piece. Additionally, there are provided a retractable abutment member or members, such as 65, actuable by piston 66 in cylinder 67 for effecting a lateral bracing engagement with the work piece. These members are shown as resiliently actuated into work engaging position by springs 68, while hydraulically retracted or moved into work releasing or disengaging position, these positions of the members 65 being shown respectively in the right and left hand portions of Figure 6.

In the operation of the machine, a work piece is introduced and clamped in the holding fixture when this fixture is at the front or operator's position as respects the machine. In the interest of rapid production it is desirable that the same be quickly moved from this position through 180 degrees properly to present the same for milling by the cutters 44. For effecting this movement there is provided a table drive motor 69 operating worm 70, and through worm wheel 71 and pinion 72 the ring gear 73 on the underside of the table.

Figure 3:
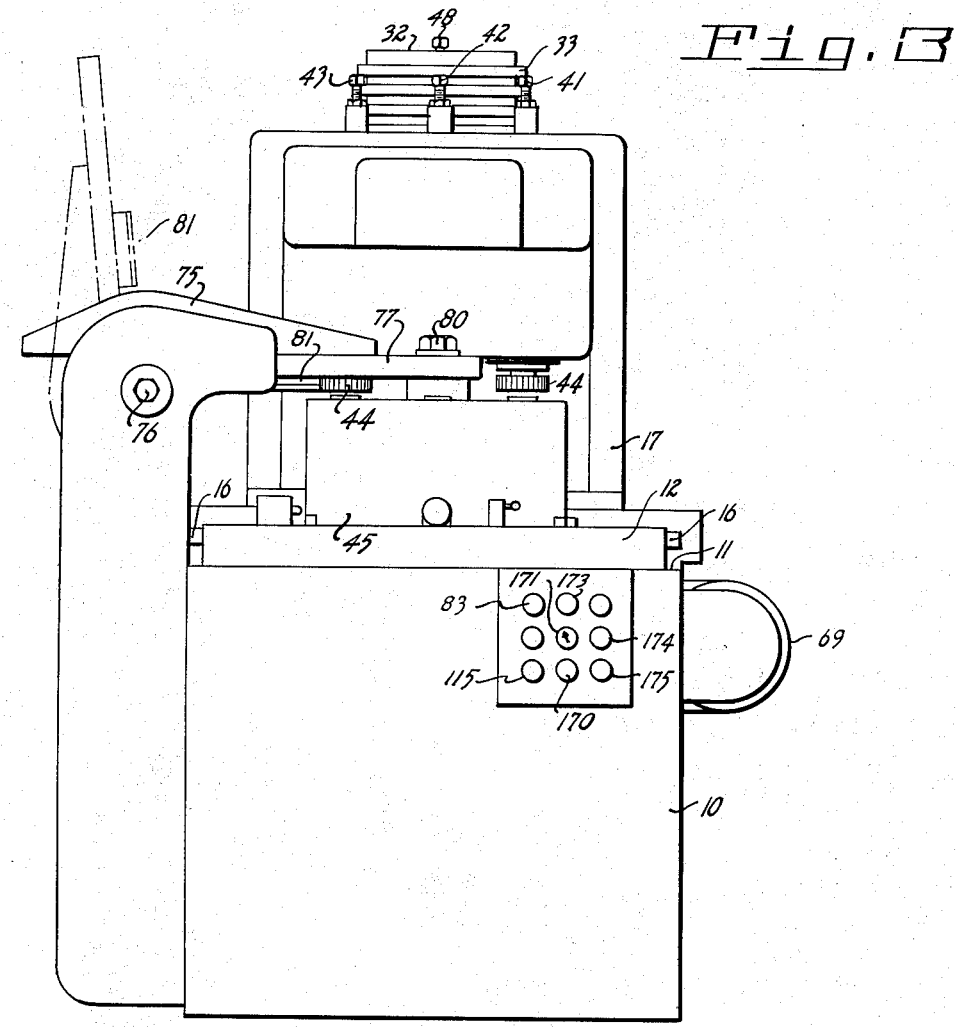
Figure 3 is a view from the front or operator's position.
Figure 4:
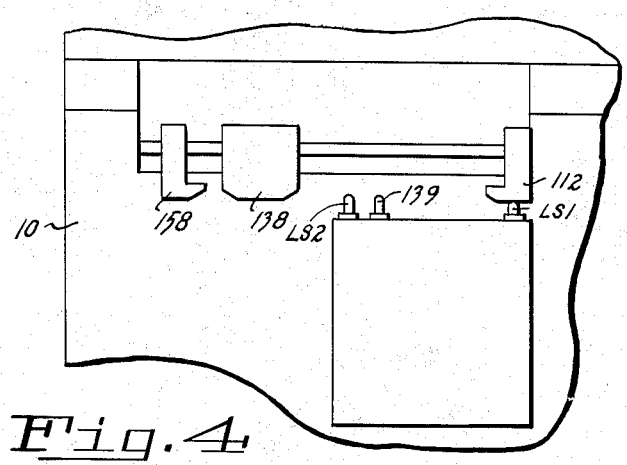
Figure 4 is a fragmentary view illustrating certain of the control devices.

To further increase the efficient high speed production of finish work pieces there are provided at the left hand side of the bed, as viewed from the front in Figure 3, the arms 74 and 75 in which is mounted the trunnion 76 pivotally supporting the broach carrier frame 77 which may be swung from the retracted position indicated in dotted lines in Figure 3 to a position where it will overlie the table effected path of rapid traverse movement of the work piece 45 subsequent to performance of the milling operation, it being understood that the table is rotated in a counterclockwise direction. This broach carrier has a slot 78 at its inner end adapted to fit over the terminal stud 79 of the trunnion post 13 where it may be clamped in position by the nut or like member 80. The broach carrier has suitably mounted on its underface the broach 81 held at such height and so positioned as to engage the milled portions 82 of the work piece to effect a finish broaching operation preferably removing but a few thousandths of stock. This broaching, it will be noted, is performed during the rapid traverse movement of the table with the broach stationary and the work moving at a rapid speed with respect to the broach so that no additional time is consumed in the cycle of operation due to the performance of the broaching operation during the retraction of the milled work piece and presentation of the new piece of work to the milling cutters.

Operation of the machine

In placing the machine in operation master start button 83 is depressed, effecting energization of the table rotating motor 69 and a suitable motor, not shown, for driving the hydraulic pump 84, and closing of the control circuit switch 111. Pump 84 provides the necessary flow of hydraulic operating medium under pressure, drawing hydraulic medium from the tank 85 to create a pressure as determined by relief valve 86 within the pressure or power conduit 87. Return flow from the various hydraulically actuable mechanisms is to tank 85 through the return conduit system 88, while reservoir drainage to take care of leakages is returned to the supply tank by the conduit system 89. The pump 84 and motor 69 having been energized, control handle 90 for valve 91 is shifted to the position shown at the right in Figure 6. The hydraulic actuating medium is supplied from 87 through a conduit 87c in post 13 and distributing groove 92 by way of a port 93 in the sleeve 94 secured on the table 12 to the various fixture elements carried by the table. This hydraulic power is therefore available as respects the fixture elements in any position of rotation of the table. Likewise, the main return 88 is coupled through a second port 95 in sleeve 92 with the distributing groove 96 of member 13 and the general drain conduit 89 coupled through a third port 97 with the distributor groove 98 in the member 13. Lever 90 and valve 91 having been positioned with the valve element occupying a vertical position as illustrated at the right hand side of Figure 6, conduit 99 containing the delay resistance 100 which extends to the forward or inner end of cylinder 67 is coupled with return conduit 88 so that the spring 68 may expand, moving the work engaging abutment 65 inward. Pressure conduit 87B is coupled through check valve 101 to accumulator 102 and to the left hand side of valve 91 by the branch conduit 87A. As shown, pressure is connected by 91 to conduit 103 to react against piston 61, moving the clamp 56 into gripping engagement with the workpiece. At the same time pressure in branch conduit 103A moves valve 104 upward against the action of spring 105 to couple 103A with 103B, moving piston 58 to the right to tighten clamp 55 against the work.

Cycle control

The electrical mechanism for control of the cycle of operation of the machine is diagrammatically illustrated in Figure 7 and includes transformer having a primary 107 and the secondary 108 providing a control circuit. Connections to one side of the secondary of the transformer are indicated by small squares, such as 109, while the connections to the opposite side of the transformer secondary of the transformer are indicated by the triangles 110. Closing of switch 111 operatively conditions this circuit. With the slide 17 in its retracted position, dog 112 actuates the limit switch LS1, raising same to complete the circuit between 113 and 114, which latter extends to the cycle start switch 115, which can be momentarily manually operated, completing the circuit to 116, 117 and 118. 118 is coupled through normally closed CR8–4 by 119 and the automatic selector switch 120 by way of 121 to control relay CR5, energizing the latter.

This closes the holding circuit for CR–5 by way of CR5–1 and CR8–4. Closing of CR5–2 couples 116 by way of 122 and normally closed CR4–2 to CR9, energizing the latter to close its switch elements. The control circuit from LS1 is completed through CR5–3, CR9–2, and CR9–3 to effect energization of control relay CR2 which is retained energized by the holding circuit through CR2–1. At this time LS3 is held in raised position by table stop dog 12. Energization of CR2 opens the normally closed switch CR2–3 for the brake 125 on shaft 126 by which motor 69 drives the table operating worm 70, releasing this brake and at the same time CR2–4 energizes clutch 127, operatively connecting the motor 69 with worm 70 to cause rotation of the table in a counterclockwise direction. As the table rotates, LS3 is released from its upper position to occupy the position shown in Figure 7, transferring the circuit from CR5–3 through CR2–1 to CR2.

This breaks the circuit to CR3 which is deenergized, allowing CR3–1 to close and CR3–2 to open as indicated in Figure 7, energizing CR4, to open the circuit CR4–2 and close the circuit CR4–1. Opening of CR4–2 deenergizes and releases CR9. Latch 130 locks CR4–2 in place. Counterclockwise movement of the table continues until dog 129 again operates limit switch LS3, raising the same to energize CR3 and breaking the circuit to CR2 to disengage the clutch and apply brake 125 instantly to stop the table rotation.

A control circuit is completed through CR5–4, CR3–2, CR4–1, and LS2, normally closed CR8–1 to control relay CR7. Energization of this relay opens normally closed CR7–1, and closes CR7–2, energizing solenoid 1. Energization of solenoid 1 moves the control valve 130' for the ram or slide 17 toward the left as viewed in Figure 5 against the action of the centralizing spring 131, coupling pressure conduit 87 through conduit 132 with the right hand end of reversing valve 133 correspondingly shifting this valve to the left to couple pressure conduit 87 with conduit 134. Conduit 134 is coupled with the rear end of cylinder 20 to introduce actuating pressure, moving piston 21 in a direction to shift the ram or slide 17 toward the left or from retracted to work tooling position as the machine is viewed in Figure 2.

When in retracted position, pressure line 87 has been coupled by way of cannelure 135 with conduit 136, coupled with the upper end of cylinder 29 holding the spindle carrier 19 in raised position. Introduction of pressure into 134, however, reacts against the lower end of valve 106, raising the same to couple pressure with conduit 137, raising piston 28, and lowering the spindle carrier and thus the cutters 44 to the extent permitted by the adjustable stop 50 so that they will properly engage and cut the selected areas on the work piece 45.

Initial movement of the ram 17 will be at a fast or rapid traverse rate until the feed dog 138 engages plunger 139 on depressable valve 140 upwardly urged by spring 141. When this valve is in its raised position its cannelure 142 couples pressure conduit 87 with the left hand chamber 143 which contains the shiftable valve 144, urging this valve to a right hand position as shown in Figure 5 against the action of spring 145. With the valve in the position shown, the return flow from cylinder 20 has been by way of conduit 146, one way operating check valve 147, conduit 148, cannelure 149 of valve 133, conduit 150 and from cannelure 151 to cannelure 152 of valve 144 by way of the groove 153 through reservoir conduit 88. This flow has been sufficiently unrestricted to permit of the rapid advance of ram 17.

When, however, the feed control dog 138 depresses plunger 139, cannelure 142 will couple conduit 154, previously a pressure conduit with the exhaust line 88, releasing valve 144 for movement to the left so that valve spool 155 will shut off the exhaust flow by way of groove 153, necessitating that this flow be by way of the by-pass conduit 156 containing the variable rate throttle 157 by which the fluid from the forward or discharge end of cylinder 20 will pas by way of cannelure 152 into conduit 88. The ram will continue its forward advance at a rate determined by the setting of the throttle 157 during performance of the desired milling operation and until the adjustable dog 158 on the ram engages and actuates forward limit switch LS2. This will shift LS2 upwardly from the position shown in Figure 7, effecting energization of CR10, releasing latch 130 and energizing CR6 while interrupting the circuit to CR7, thus deenergizing the solenoid 1.

Deenergization of CR7 will release CR7-1, permitting the same to close the position indicated in Figure 7. At the same time, a control circuit is completed through CR1-4, closed CR6-1, LS1, and CR7-1, energizing CR8. This closes switch CR8-3, energizing solenoid 2 to move valve 130' toward the right.

Movement of valve 130' to the right couples pressure conduit 87 with conduit 160, the pressure thus being introduced into valve chamber 161, moving valve 133 toward the right to couple pressure conduit 87 with conduit 148 and conduit 134 by way of resistance 163 with return conduit 88. This coupling will release the clamping pressure for table 12 previously exerted in 134 against piston 164, while creating pressure against the lower end of valve 165, raising this valve against pressure of spring 166 so that its cannelure 167 will couple a pressure line 148 with branch 168 of conduit 146, providing an unobstructed flow of fluid into the forward end of cylinder 20, reacting on piston 21 rapidly to retract the ram 17 and cutters. At the same time, pressure in 148 will move valve 106 into its lower position as shown in Figure 5 so that pressure from 87 will be effective through 136 to cylinder 29 to elevate the spindle carrier and avoid drag of the cutters over the finished work surface. These movements will continue until dog 112 engages the rearward movement limit switch LS1, interrupting the energizing circuit to CR8 which is deenergized, causing opening of the switch CR8-3 and consequent deenergization of solenoid 2 so that the valve 130' will be moved into a neutral centralized position as indicated in Figure 5 and the machine brought to rest, ready for initiation of another cycle of operation by depression of the cycle start button 115.

If it is desired to interrupt the cyclic operation of the machine at any point this may be effected by depressing the cycle stop button 170 which interrupts all potential coupling of the control circuit lead 113 with the several electrical controls except such coupling as may be effected through LS3 to CR3. If the automatic cycle is so stopped, for restoration of operations, it is necessary to shift the control 171, opening switch 120 and closing the manual operation switch 172. This effects energization of control relay 1, opening CR1-4 which has previously connected the one side of the control circuit by way of CR6-1, CR8-2 to one of the contacts of LS1. Energizing CR1 closes the circuit through switch CR1-1 to the manual index control button 173 to CR9 and by way of normally closed CR4-2 to CR9-1. This also closes CR1-2 coupled with CR2-1 and CR2-2, the latter being connected by normally closed CR3-1 to energize control relay CR4. A third control circuit is completed by way of CR1-3 to the slide forward job control button 174 from which the circuit extends by way of LS2 in its normal position and normally closed CR8-1 for actuation of CR7 controlling solenoid 1 for inward movement of the ram. At the same time another circuit is coupled through CR1-5 to manually operable switch 175, completable by closing of 175 to LS1 in its normal position and normally closed CR7-1 to CR8, controlling solenoid 2 for effecting retracting movements of the ram. From the foregoing it will be evident that when the circuit is conditioned for manual control, depression of the respective button controlled switches may effect either manually controlled indexing or forward and retracting movements of the tool carrying ram element for adjustment or set-up purposes or completion of an interrupted cycle conditioning the machine for subsequent cyclic operation.

It will further be apparent that due to the position of the broaching cutter 81, counterclockwise rapid traverse indexing of the table subsequent to the initial milling of the selected spots or portions 82 on the workpiece 45 will move the work piece at a suitable high speed broaching rate with respect to the broaching cutter and effect a finish broaching operation on the previously milled work piece during the time in which it is being rapidly traversed from milling to unloading position so that no machining time is lost in connection with the performance of this second operation upon the work.

From the foregoing description taken in connection with the accompanying drawings it will be noted that there has been provided an improved process for sequential performance of roughing and finishing operations upon a work piece in which the machining time is reduced to a minimum; in which the work can be quickly positively secured in machining position in the fixture and an automatic cycle of rapid positioning of the work, rapid advance of the cutting tools with subsequent feed, clearance of the tools with respect to the work and rapid retraction automatically effected without the necessity of further attention of the operator, but in which alternatively the cycle of operation may be interrupted at any point and additional auxiliary control mechanism utilized for manual determination of subsequent operations. It will further be noted that such manual control mechanism may be alternatively employed for complete manual relative shifting of the parts in any desired cycle or source of operations but that in either event improved hydraulic controls have been provided for effecting the several movements as for insuring proper automatic clamping of the work prior to any major machining operation, unclamping of the work table to permit its indexing and for effecting a retracting or separating movement of the work surface and cutting tool to prevent damage to the work surface by high speed dragging of the tool over the work.

Attention is invited to the fact that the present improved process is most efficient in the rapid continuous quantity production of finished surfaces on work pieces, in that the work pieces are rapidly advanced to a position in which a roughing cut may be taken in direction substantially normal to the path of advance of the work and that the work is then retracted in a continuation of the path of advance at a rapid traverse rate for removal or discharge and that in accordance with the present improved process during the rapid retraction an additional stock removing cut is performed as respects the initially rough cut or semi-finished surfaces. It will further be noted that in accordance with the present improved process, this second cut is taken by a tool effective in a crosswise direction or direction overlapping the revolution or cutter marks produced by the first rotary cutter and extending transversely or at right angles to the direction of relative feed during the first cutting operation so as adequately to skive off an additional finish cut from the semi-finished surface, leaving an extremely desirable final finish surface on the work piece. When the process is carried out by movement of the work in an arcuate path toward and continuing away from the first cutting member, the first cut is preferably performed in a substantially radial direction as respects said path while, due to relative movement of the parts, the second cut is effective in a tangential direction, during the rapid traversing of the work away from the cutter and without loss of time due to stopping or slowing down of the work at a second machining position, the nature and relationship of the successive surface forming cuts being such that the second machining or surface finishing operation may be performed at a rapid traverse as distinct from a normal feeding rate of movement.

What is claimed is:

1. The process of high production machining consisting in effecting an arcuate shifting of a work piece at a rapid traverse rate to a working position, interrupting said arcuate shifting and effecting a slow relative feeding movement between the work piece and a milling cutter to mill a surface thereon, reestablishing rapid traverse arcuate shifting of the work piece, and performing a broaching operation on said milled surface during said reestablished rapid traverse arcuate shifting thereof.

2. The process of producing a finished broached surface on a work piece consisting in mounting the work piece at a loading station on a rotatable supporting table, effecting rapid traverse rotation of the table to move the work piece to a milling position, effecting a milling operation in a substantially radial path on the work piece with respect to a stationary broach, rapid traversing the work piece by continued rotation of the table and during said latter rapid traversing of the work piece broaching the previously milled portion of the work piece in a path transverse to the milling path to wipe off the cutter marks from the preceding milling operation.

3. The process of producing a finished surface on a work piece consisting in rapidly advancing the work piece in an arcuate path into opposition to a rotary cutter, effecting relative movement at a feeding rate between the work piece and cutter in a first path radial as respects said arcuate path to form a semi-finished surface on said work piece, further advancing said work piece in said arcuate path at a rapid traverse rate and further said surface during said further rapid traverse advance broaching the semi-finished surface in a path substantially tangent to the arcuate path of movement of the work and transverse to the first radial path.

4. The process of producing a finished surface on a workpiece consisting in mounting the workpiece on a rotary table, rotating the table to present the mounted workpiece in opposition to a milling cutter, effecting a milling operation by relative linear feeding movement between the workpiece and milling cutter, thereafter effecting rapid withdrawal of the workpiece with respect to the cutter in an arcuate path by rapid traverse rotation of the table and during such rapid traverse withdrawal effecting a broaching of the milled portion of the workpiece along a path chordal as respects the arcuate path of movement of the work and transverse to the feeding path of the milling operation.

5. The process of producing a finished surface on a workpiece consisting in effecting a unidirectional rapid traverse rotary movement of a workpiece in an arcuate path from a loading to discharge position, interrupting the rapid traverse movement, milling the workpiece along a prescribed path during such interruption in movement, continuing the progressive rotary movement of the workpiece at a rapid traverse rate and during such continued rapid traverse movement, broaching the milled surface by a stationary broaching cutter chordally located as respects said arcuate path and effective in a cutting direction transverse to said prescribed milling path.

References Cited in the file of this patent

UNITED STATES PATENTS

| | | |
|---|---|---|
| 576,979 | Gregory | Feb. 9, 1897 |
| 1,327,881 | Roth | Jan. 13, 1920 |
| 1,949,515 | Norton | Mar. 6, 1934 |
| 1,952,194 | Drissner | Mar. 27, 1934 |
| 1,962,567 | Lovejoy | June 12, 1934 |
| 2,007,827 | Fletcher | July 9, 1935 |
| 2,027,726 | Fletcher | Jan. 14, 1936 |
| 2,156,692 | Hixon | May 2, 1939 |
| 2,216,141 | Sinclair | Oct. 1, 1940 |
| 2,352,132 | Southwell | June 20, 1944 |
| 2,506,082 | Hartman | May 2, 1950 |
| 2,517,358 | Seaman | Aug. 1, 1950 |
| 2,543,661 | Edlich | Feb. 27, 1951 |
| 2,548,702 | Chamberlain | Apr. 10, 1951 |